(12) United States Patent
Muehlhausen et al.

(10) Patent No.: US 9,718,495 B2
(45) Date of Patent: Aug. 1, 2017

(54) STRUCTURAL ELEMENT IN THE FRONT REGION OF A MOTOR VEHICLE

(71) Applicant: Bayerische Motoren Werke Aktiengesellschaft, Munich (DE)

(72) Inventors: Mark Muehlhausen, Woerth (DE);
Thomas Ritschel, Munich (DE);
Franz-Peter Behrendt, Munich (DE);
Dirk Lukaszewicz, Augsburg (DE);
Sebastian Goldschmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/878,683

(22) Filed: Oct. 8, 2015

(65) Prior Publication Data
US 2016/0023682 A1 Jan. 28, 2016

Related U.S. Application Data

(63) Continuation of application No. PCT/EP2014/056660, filed on Apr. 3, 2014.

(30) Foreign Application Priority Data

Apr. 9, 2013 (DE) .................. 10 2013 206 250

(51) Int. Cl.
*B62D 21/15* (2006.01)
*B60K 5/12* (2006.01)

(52) U.S. Cl.
CPC .......... *B62D 21/152* (2013.01); *B60K 5/1275* (2013.01)

(58) Field of Classification Search
CPC .................... B62D 21/152; B60K 5/1275

USPC .................................................. 296/187.09
See application file for complete search history.

(56) References Cited

U.S. PATENT DOCUMENTS

| 4,518,058 | A | 5/1985 | Fister et al. |
| 8,256,831 | B2 * | 9/2012 | Abe .................. B60R 19/34 |
| | | | 296/133 |
| 2006/0022473 | A1 | 2/2006 | Hansen |
| 2008/0106107 | A1 | 5/2008 | Tan et al. |

(Continued)

FOREIGN PATENT DOCUMENTS

| CN | 101177149 A | 5/2008 |
| DE | 2 241 651 A | 3/1974 |
| DE | 43 18 260 A1 | 12/1993 |

(Continued)

OTHER PUBLICATIONS

German Search Report issued in counterpart German Application No. 10 2013 206 250.8 dated Nov. 14, 2013, with English translation (Ten (10) pages).

(Continued)

*Primary Examiner* — D Glenn Dayoan
*Assistant Examiner* — Dana D Ivey
(74) *Attorney, Agent, or Firm* — Crowell & Moring LLP

(57) ABSTRACT

A structural element in the front region of a motor vehicle is arranged between an engine subframe and a bulkhead of the motor vehicle. The structural element has a deformation element which is fastened via a front fixing to the engine subframe and a rear fixing to the bulkhead. The front fixing is connected via an upper shell and a lower shell to the bulkhead in such a way that the two shells form a closed, funnel-shaped structure with one another.

18 Claims, 2 Drawing Sheets

(56) References Cited

U.S. PATENT DOCUMENTS

2012/0118660 A1\* 5/2012 Tamura ................ F16F 13/103
                                                                   180/312

FOREIGN PATENT DOCUMENTS

| | | |
|---|---|---|
| DE | 299 07 513 U1 | 10/1999 |
| DE | 102 57 262 A1 | 6/2004 |
| DE | 103 40 955 A1 | 5/2005 |
| DE | 10 2006 058 604 A1 | 6/2008 |
| DE | 10 2006 058 604 B4 | 11/2008 |
| DE | 10 2008 062 501 A1 | 6/2010 |
| EP | 1 069 027 A2 | 1/2001 |
| GB | 2 367 270 A | 4/2002 |
| JP | 2003-285766 A | 10/2003 |
| JP | 2008-49894 A | 3/2008 |
| JP | 2009-83756 A | 4/2009 |
| JP | 2012-148708 A | 8/2012 |

OTHER PUBLICATIONS

International Search Report (PCT/ISA/210) issued in counterpart International Application No. PCT/EP2014/056660 dated Jul. 7, 2014, with English translation (Six (6) pages).
English translation of Chinese-language Office Action issued in counterpart Chinese Application No. 201480020309.5 dated Feb. 27, 2017 (Five (5) pages).

\* cited by examiner

STRUCTURAL ELEMENT IN THE FRONT REGION OF A MOTOR VEHICLE

CROSS REFERENCE TO RELATED APPLICATIONS

This application is a continuation of PCT International Application No. PCT/EP2014/056660, filed Apr. 3, 2014, which claims priority under 35 U.S.C. §119 from German Patent Application No. 10 2013 206 250.8, filed Apr. 9, 2013, the entire disclosures of which are herein expressly incorporated by reference.

BACKGROUND AND SUMMARY OF THE INVENTION

The present invention relates to a structural element in the front region of a motor vehicle.

Structural elements in the front region of a motor vehicle are well known. They serve for the introduction of load from the front-end section of the motor vehicle into the bulkhead thereof, and are designed for example as front-end section structures and bulkhead structures constructed from sheet-metal shells. Loads of the engine bracket are introduced, by way of a branching of lower longitudinal members and connection members of the front-end structures and bulkhead structures, into the floor structure, the A pillar and the tunnel. Furthermore, structures composed of aluminum are known in which the engine bracket, as a profiled component, transmits its load into the floor and side frame structure via welded-on and riveted-on profiles and cast nodes.

A disadvantage of the known concepts is the limited lightweight construction potential of the metallic materials, and the problems with regard to thermal expansion and corrosion that arise in the case of the combination of metal structures with CFRP structures.

It is therefore an object of the present invention to eliminate the abovementioned problems.

This and other objects are achieved according to the invention by way of a structural element in the front region of a motor vehicle, which structural element is arranged between an engine bracket and a bulkhead of the motor vehicle. The structural element has a deformation element which is fastened by way of a front fixing to the engine bracket and by way of a rear fixing to the bulkhead. The front fixing is connected to the bulkhead by way of an upper shell and a lower shell such that the two shells together form a closed, funnel-shaped structure.

In relation to metallic structural concepts and metal-CFRP mixed structures, the configuration according to the invention yields greater lightweight construction potential. In relation to a purely CFRP shell-type construction, the energy absorption in the event of a crash is considerably increased. The deformation behavior can be controlled in an effective manner through the configuration of the deformation element, and can with little outlay be adapted to different requirements owing to different crash weights in vehicle variants of a type series.

In one advantageous refinement, the deformation element is composed of a fiber-composite plastic.

It is advantageously the case that the rear fixing is connected, in particular screwed, to the bulkhead by way of detachable fastening elements and is supported on load distributor plates which are integrated into the bulkhead.

The bulkhead is advantageously composed of a fiber-composite material with a foamed core.

In a preferred refinement, the load distributor plates are integrated, together with the fastening elements for the rear fixing of the deformation element, into the foamed core of the bulkhead.

The funnel-shaped structure formed by the shells is advantageously connected to the bulkhead such that said structure supports the engine bracket with respect to the bulkhead at least in a horizontal and a vertical direction.

In one advantageous embodiment, the deformation element and the front fixing are fastened to the engine bracket by way of an easily detachable fastening element. Owing to this embodiment, it is possible, in the event of repairs after damage to the engine bracket, for the latter to be exchanged easily and with reasonable outlay.

In order for damage to the deformation element to be easily identified from the outside, it is provided in a preferred refinement that at least one of the two shells is, in at least one sub-region, designed such that, in the event of a load which leads to damage to the deformation element, the shell undergoes visible change.

According to the invention, therefore, the transition from the engine bracket into the bulkhead is designed as a substantially pure CFRP structure. In this case, the stiffness of the front region of the motor vehicle is attained by way of a funnel-shaped structure which produces the connection between the engine bracket and the bulkhead. The crash loads are introduced via the deformation element into the bulkhead, which, in the connecting region, is of sandwich form with an integrated metallic load distributor plate. By way of the combination of the funnel-shaped shell structure with the deformation element situated on the inside, it is possible for all occurring forces and moments to be introduced, in a manner suited to the loads and fiber composite, into the bulkhead which is equipped with a suitable reinforcement.

Other objects, advantages and novel features of the present invention will become apparent from the following detailed description of one or more preferred embodiments when considered in conjunction with the accompanying drawings.

DETAILED DESCRIPTION OF THE DRAWINGS

The figures illustrate only those parts of the structural element according to the invention which are of interest here; all other elements have been omitted for the sake of clarity.

Figure 1:
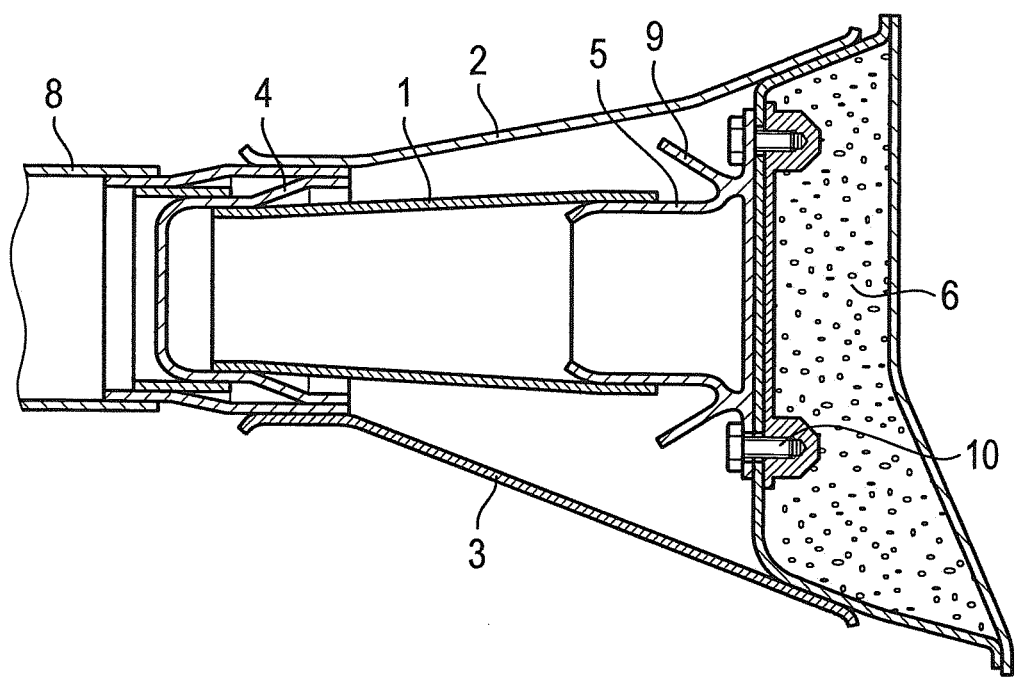
FIG. 1 is a vertical longitudinal section view through the structural element according to an embodiment of the invention.
Figure 2:
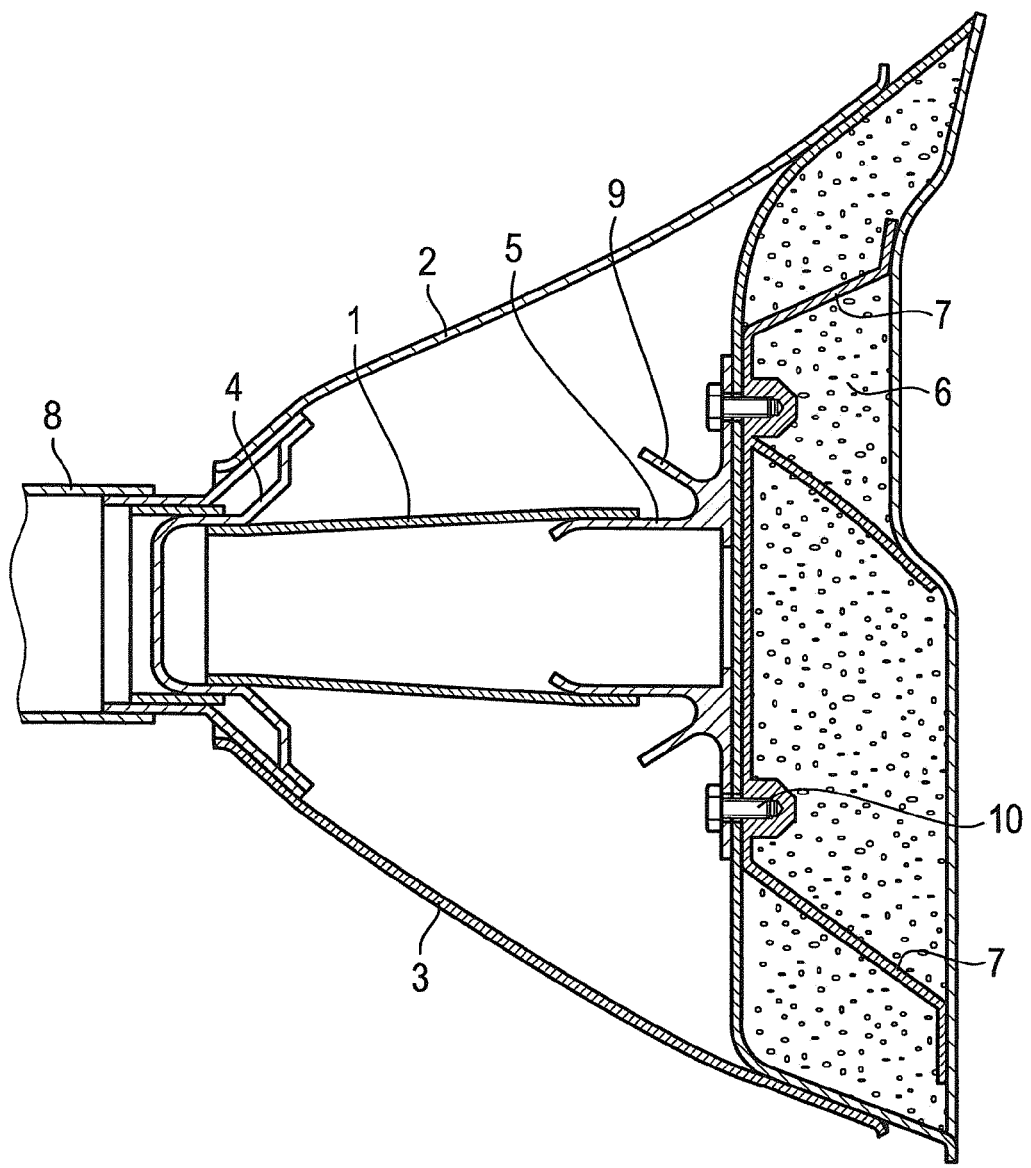
FIG. 2 is a horizontal longitudinal section view through the structural element according to an embodiment of the invention.

Referring to FIGS. 1 and 2, in the front region of a motor vehicle there is arranged a structural element which serves for the introduction of loads. The structural element, which is arranged between an engine bracket 8 and a bulkhead 6 of the motor vehicle, has a deformation element 1 which is fastened by way of a front fixing 4 to the engine bracket 8 and by way of a rear fixing 5 to the bulkhead 6.

The bulkhead 6 is advantageously composed of a fiber-composite material with a foamed core.

The front fixing 4 is connected to the bulkhead 6 by way of an upper shell 2 and a lower shell 3 in such a way that the two shells 2, 3 together form a closed, funnel-shaped structure.

The deformation element 1, which is arranged within the two shells 2, 3, is preferably composed of a fiber-composite plastic, and has a substantially tubular form.

The front fixing 4, which is fastened to the engine bracket 8, is in the form of a pot-shaped sleeve and engages around the deformation element 1 from the outside, whereas the rear fixing 5, which is arranged on the bulkhead 6, is in the form of a tubular sleeve and projects into the tubular deformation element 1.

The rear fixing 5 is equipped with a stop collar 9 which limits a displacement of the deformation element 1 in the direction of the bulkhead 6. Furthermore, the rear fixing 5 is connected, in particular screwed, to the bulkhead 6 by way of detachable fastening elements 10 and is supported on load distributor plates 7 (see FIG. 2) which are integrated into the bulkhead 6 or into the fiber-composite material equipped with a foamed core.

The funnel-shaped structure formed by the shells 2, 3 is connected to the bulkhead 6 such that said structure supports the engine bracket 8 with respect to the bulkhead 6 at least in a horizontal and a vertical direction.

The front fixing 4, by which the deformation element 1 is connected to the engine bracket 8 and to which the shells 2, 3 are also attached, can be separated from the engine bracket 8 with little outlay, such that, in the event of repairs after damage to the engine bracket 8, the latter can be exchanged with reasonable outlay.

Furthermore, at least one of the two shells 2, 3 is, in at least one sub-region, designed such that, in the event of a load which leads to damage to the deformation element 1, the shell 2, 3 undergoes a visible change.

The invention advantageously provides for the introduction of load from the front-end section of a motor vehicle into the bulkhead 6 thereof, wherein the engine bracket 8 is attached to the bulkhead 6 by way of a funnel-shaped shell structure composed of the shells 2, 3, and, within the two shells 2, 3, a deformation element 1 connects the engine bracket 8 to the bulkhead 6. The bulkhead 6 is, in the attachment region, designed as a sandwich structure with two outer layers composed of a fiber-composite plastic and with load distributor plates 7 integrated into the foamed core. The load distributor plates 7 have, at the front side, fastening elements 10 for the attachment of the deformation element 1, whereas the load distributor plates 7 are supported, in the manner of an angle bracket, on the rear shell of the bulkhead 6.

It should basically be noted that the deformation of the described deformation element 1 should take place only after the deformation of the engine bracket, which is situated spatially in front.

The above description of the present invention serves merely for illustrative purposes and not for the purposes of restricting the invention. In the context of the invention, various changes and modifications are possible without departing from the scope of the invention and of its equivalents.

LIST OF REFERENCE NUMERALS

1 Deformation element
2 Upper shell
3 Lower shell
4 Front fixing
5 Rear fixing
6 Bulkhead
7 Load distributor plate
8 Engine bracket
9 Stop collar
10 Connecting elements The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A structural element in a front region of a motor vehicle, the structural element being arrangeable between an engine bracket and a bulkhead of the motor vehicle, the structural element comprising:
    a deformation element;
    a front fixing by which the deformation element is fastenable to the engine bracket;
    a rear fixing by which the deformation element is fastenable to the bulkhead;
    an upper shell and a lower shell, wherein
        the front fixing is connected to the bulkhead via the upper shell and the lower shell such that the upper and lower shells together form a closed, funnel-shaped structure within which the deformation element is enclosed.

2. The structural element according to claim 1, wherein the deformation element is made of a fiber-composite plastic.

3. The structural element according to claim 2, wherein the bulkhead has one or more load distributor plates integrated therein, the structural element further comprising:
    detachable fastening elements by way of which the rear fixing is connected to the bulkhead, the rear fixing being supported on the one or more distributor plates integrated into the bulkhead.

4. The structural element according to claim 3, wherein the detachable fastening elements include threaded fasteners.

5. The structural element according to claim 1, wherein the bulkhead has one or more load distributor plates integrated therein, the structural element further comprising:
    detachable fastening elements by way of which the rear fixing is connected to the bulkhead, the rear fixing being supported on the one or more distributor plates integrated into the bulkhead.

6. The structural element according to claim 5, wherein the detachable fastening elements include threaded fasteners.

7. The structural element according to claim 1, wherein the funnel-shaped structure formed by the upper and lower shells is connectable to the bulkhead so as to support the engine bracket with respect to the bulkhead at least in a horizontal and vertical direction.

8. The structural element according to claim 1, wherein the deformation element and the front fixing are fastenable to the engine bracket via a detachable fastening element.

9. The structural element according to claim 1, wherein at least one of the upper and lower shells is configured such that, in an event of a load leading to damage to the deformation element, the at least one shell undergoes a visible change in at least one sub-region.

10. A front region of a motor vehicle, comprising:
    an engine bracket;

a bulkhead;

a structural element arranged between the engine bracket and the bulkhead, wherein the structural element comprises:
- a deformation element;
- a front fixing by which the deformation element is fastened to the engine bracket;
- a rear fixing by which the deformation element is fastened to the bulkhead;
- an upper shell and a lower shell by which the front fixing is connected to the bulkhead, the upper and lower shells together forming a closed-funnel-shaped structure within which the deformation element is enclosed.

11. The front region according to claim 10, wherein the deformation element is made of a fiber-composite plastic.

12. The front region according to claim 11, further comprising:
- one or more load distributor plates integrated into the bulkhead;
- detachable fastening elements by which the rear fixing is connected to the bulkhead, the rear fixing being supported on the one or more load distributor plates integrated into the bulkhead.

13. The front region according to claim 12, wherein the bulkhead is made of a fiber composite material with a foamed core.

14. The front region according to claim 13, wherein the one or more load distributor plates are integrated, together with the detachable fastening elements, into the foamed core of the bulkhead.

15. The front region according to claim 14, wherein the funnel-shaped structure formed by the upper and lower shells is connected to the bulkhead so as to support the engine bracket with respect to the bulkhead at least in a horizontal and vertical direction.

16. The front region according to claim 15, wherein the deformation element and the front fixing are fastened to the engine bracket via a detachable fastening element.

17. The front region according to claim 16, wherein at least one of the upper and lower shells is configured such that, in an event of a load leading to damage to the deformation element, the at least one shell undergoes a visible change in at least one sub-region.

18. A structural element in a front region of a motor vehicle, the structural element being arrangeable between an engine bracket and a bulkhead of the motor vehicle, the structural element comprising:
- a deformation element;
- a front fixing by which the deformation element is fastenable to the engine bracket;
- a rear fixing by which the deformation element is fastenable to the bulkhead;
- an upper shell and a lower shell, wherein
  - the front fixing is connected to the bulkhead via the upper shell and the lower shell such that the upper and lower shells together form a closed, funnel-shaped structure, and
  - the bulkhead has one or more load distributor plates integrated therein, the structural element further comprising:
  - detachable fastening elements by way of which the rear fixing is connected to the bulkhead, the rear fixing being supported on the one or more distributor plates integrated into the bulkhead.

* * * * *